Dec. 8, 1953     J. H. STROOP     2,661,753
COMBINED SEAT AND SAFETY DISK ELEMENT FOR VALVES
Filed May 7, 1946
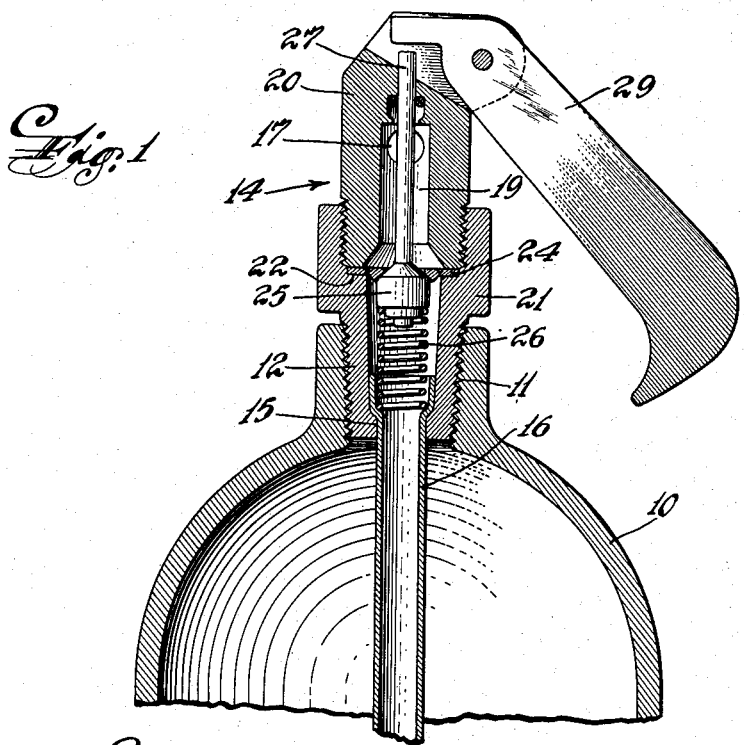
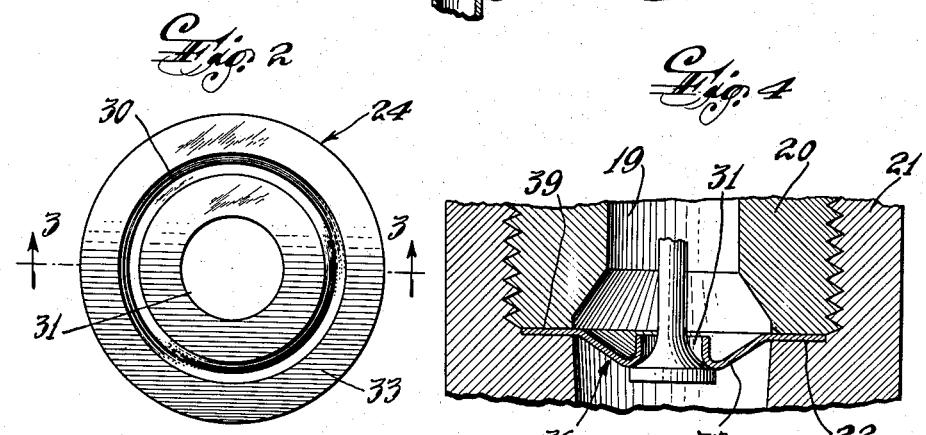
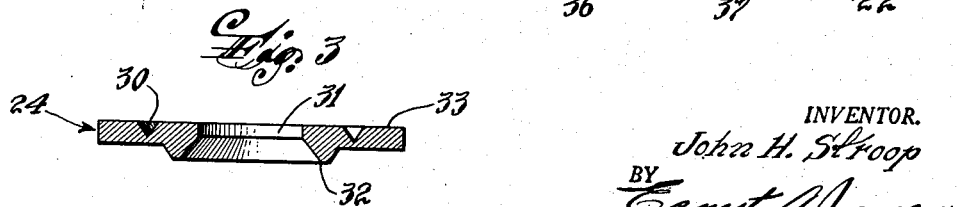
INVENTOR.
John H. Stroop
BY
Ernest A. Jensen
ATTORNEY Patented Dec. 8, 1953

2,661,753

UNITED STATES PATENT OFFICE 2,661,753

COMBINED SEAT AND SAFETY DISK ELEMENT FOR VALVES

John H. Stroop, New York, N. Y., assignor to Specialties Development Corporation, Belleville, N. J., a corporation of New Jersey Application May 7, 1946, Serial No. 667,902

2 Claims. (Cl. 137—68)

This invention relates to valves for controlling the discharge of fluid media stored under relatively high pressure, and, more particularly, to a combined valve seat and safety disc for such valves.

In connection with valves for controlling the discharge of compressed or liquefied gaseous media stored under relatively high pressure in containers, commonly known as cylinders, it is customary to provide a safety disc which is rupturable upon the development of an internal pressure in excess of the pressure the container can safely withstand, whereby to release the media and thus avoid possible bursting of the container. In most installations, it is usual to provide a special vent passage in the valve body in which the safety disc is positioned and to provide an anti-recoil assembly or fitting for this passage to prevent recoil of the container in the event the safety disc is ruptured and the media is released through the vent passage. The provision of such a safety discharge passage results in another point at which leakage may occur.

Also, in the past considerable difficulty has been experienced in the manufacture of safety discs. The form conventionally used has consisted of a sheet of Phosphor bronze or similar material which may be plated with other metal and positioned across an aperture to act as a diaphragm. The sharpness of the edge of the aperture in back of the safety disc has a very considerable effect on the rupturing action of such a disc inasmuch as the rupture of the disc is caused by shearing action of the disc on the edge of the aperture. For example, if the edge of this aperture is very slightly rounded or has any imperfections the pressure at which the disc is ruptured will vary considerably from that pressure at which the disc is designed to rupture.

Accordingly, an object of this invention is to provide a combined valve seat and safety disc for valves of the foregoing character.

Another object of this invention is to provide a valve in which the necessity for a separate passage in the valve body for the safety disc and an anti-recoil fitting is obviated.

Another object is to provide an improved type of safety disc which is more dependable in its operation.

Another object of the present invention is to provide a combined safety disc and gasket formed from a unitary element.

A further object is to provide such an element which is simple in construction, economical to manufacture and effective and reliable in its operation.

A still further object is to provide an improved valve wherein the necessity for a separate passage in the valve body for the safety disc and the anti-recoil fitting is obviated.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a combined seat and safety disc element which comprises a rigid metallic disc having a central aperture, an annular valve member seating surface surrounding the aperture at one side of the disc, and a generally annular reinforcing portion of increased thickness surrounding the seating surface, the disc having a generally annular groove at one side thereof adjacent to and surrounding the reinforcing portion and providing an annular zone of decreased thickness serving to weaken the disc and facilitate rupture thereof at the groove upon a greater than a predetermined pressure being exerted on the disc.

A preferred embodiment of the invention has been chosen for purposes of illustration and description, and is shown in the accompanying drawing, forming a part of the specification, wherein:

Fig. 1 is a longitudinal sectional view of a valve embodying a combined valve seat and safety disc in accordance with this invention.

Fig. 2 is an enlarged top plan view of the disc shown in Fig. 1.

Fig. 3 is a sectional view taken on line 3—3 of Fig. 2.

Fig. 4 is a fragmentary sectional view of a valve, illustrating a modified form of combined valve seat and safety disc.

Referring to Fig. 1, there is shown a container 10 for storing fluid medium under pressure having a threaded opening 11 for receiving a threaded portion 12 of a valve body 14. The valve body comprises an inlet port 15 in which is positioned a syphon tube 16, an outlet port 17 and a passage 19 between the inlet and outlet ports. As illustrated, the valve body may comprise upper and lower sections 20 and 21, respectively, which are threadedly secured.

The lower valve body section 21, for example, may be provided with a shoulder 22 for supporting an apertured disc 24, in accordance with this invention, which is secured in position on the shoulder by the upper valve body section 20. A valve member 25 is urged against the disc by the pressure of the medium in the container and in addition, by a spring 26 to close the aperture of the disc and confine the medium in the container. The valve member 25 is adapted to be unseated to control the discharge of the medium by a valve stem 27 which is adapted to be operated at will by a lever 29 pivotally mounted on the valve body or by other suitable means.

Referring to Fig. 2, the disc 24 preferably is circular in shape and has a central aperture 31. An annular groove 30 is stamped, machined, molded into or otherwise formed on one surface of disc 24. Simultaneously, or in separate operations, the aperture 31 is formed in the center of disc 24 and, if desired, a ridge 32 may be formed on a surface of the disc in order to provide a valve seat for the valve member 25 and to provide an annular zone of increased thickness as shown in Fig. 3.

The disc 24 is preferably formed of copper, nickel or other suitable metal which hardens upon being worked. The forming is preferably accomplished by coining the disc so as to obtain the desired shape and to make the inner annular zone in which the groove is located more rigid than the peripheral margin 33 thereof without distortion of the latter.

The disc 24 may also be made of suitable molded plastic material or other material having the desired strength inertness and impermeability to the fluid medium confined.

In the event the fluid medium attains a predetermined excessive pressure, the disc 24 will shear at the base of the groove 30 thereof thus permitting the fluid to be discharged through the valve passage 19 within the valve body and through the outlet port 17. The valve may be operated in the normal way by depressing valve stem 27 without rupturing the safety disc 24.

The disc 24, in addition to acting as a safety valve and serving as a seat for the valve member, provides a seal between the upper and lower valve body sections. Since the peripheral margin portion 33 is formed of relatively soft material, such as unworked copper, no gasket is required to effect this seal.

A modified form of combined safety disc and valve seat is shown in Fig. 4, in which a disc 36 is formed of a relatively thin sheet of metal or other sheet material having an aperture 31 formed in the center thereof. The metal surrounding the aperture or valve port is preferably given a ribbed cross section 37 in order to give greater rigidity to the central portion of the disc. In this latter form of combined safety disc and valve seat, no groove is provided for shearing of the disc. Shearing of the disc is accomplished by pressure from the inlet side thereof which urges the disc against the edge 39 of the valve body passage 19.

From the foregoing description, it will be seen that the present invention provides an improved type valve wherein a separate safety disc and passage for the release of pressure, in the event it becomes excessive, is not required, thus giving a cheaper and more compact valve than heretofore. Furthermore, elimination of a separate safety seal eliminates an additional potential source of leakage of fluid medium, which leakage is always a problem in the control of high pressure fluid medium, particularly in valves for carbon dioxide type fire extinguishers. In addition, several parts previously required in valves of this type are no longer necessary and several machining operations are eliminated in the manufacture of a valve according to the foregoing description, thus resulting in a reduction of weight, number of parts and cost of assembly as a whole. The combined seat and safety disc is easy to manufacture and assemble, and is practical and reliable in service.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A combined seat and safety disc element for a valve wherein a valve member is adapted to confine normally gaseous media under relatively high pressure and is adapted to be operated at will to control the discharge of the confined media, said element comprising a rigid metallic disc having a central aperture, an annular valve member seating surface surrounding said aperture at one side of said disc, and a generally annular reinforcing portion of increased thickness surrounding said seating surface, said disc having a generally annular groove at one side thereof adjacent to and surrounding said reinforcing portion and providing an annular zone of decreased thickness serving to weaken said disc and facilitate rupture thereof at said groove upon a greater than a predetermined pressure being exerted on said disc.

2. A combined seat and safety disc element for a valve wherein a valve member is adapted to confine normally gaseous media under relatively high pressure and is adapted to be operated at will to control the discharge of the confined media, said element comprising a rigid metallic disc having a central aperture, and an annular reinforcing ridge of increased thickness in cross-section surrounding said aperture and provided with an annular inwardly converging valve member seating surface at one side of said disc, said disc having an annular groove at the side thereof opposite said seating surface surrounding said ridge and providing an annular zone of decreased thickness serving to weaken said disc and facilitate rupture thereof at said groove upon a greater than a predetermined pressure being exerted on said disc.

JOHN H. STROOP.

References Cited in the file of this patent

UNITED STATES PATENTS

| Number | Name | Date |
|---|---|---|
| 564,812 | Winne | July 28, 1896 |
| 701,607 | Park | June 3, 1902 |
| 1,041,945 | Anderson | Oct. 22, 1912 |
| 1,093,254 | Clarke | Apr. 14, 1914 |
| 1,357,667 | Williams | Nov. 2, 1920 |
| 1,669,700 | Egbert | May 15, 1928 |
| 1,740,420 | Friedman | Dec. 17, 1929 |
| 1,740,421 | Friedman | Dec. 17, 1929 |
| 1,740,422 | Snow | Dec. 17, 1929 |
| 2,106,176 | Huffman | Jan. 25, 1938 |
| 2,197,609 | Cornell | Apr. 16, 1940 |
| 2,414,113 | Mapes | Jan. 14, 1947 |